United States Patent Office 2,891,077
Patented June 16, 1959

2,891,077

METHOD FOR PREPARATION OF 3,17α-ACETOXY Δ³,⁵-PREGNADIENE-20-ONE DERIVATIVES AND COMPOUND PRODUCED THEREBY

Howard J. Ringold and George Rosenkranz, Mexico City, Mexico, assignors to Syntex S.A., Mexico City, Mexico, a corporation of Mexico No Drawing. Application October 22, 1953
Serial No. 387,803

Claims priority, application Mexico October 30, 1952

4 Claims. (Cl. 260—397.4)

The present invention relates to novel cyclopentanophenanthrene derivatives and to a novel process for the production thereof. More particularly the present invention relates to novel enol acetates of cortical hormones especially $\Delta^{3,5}$-pregnadiene-3,17α,21-triol-11,20-dione.

In accordance with the present invention it has been discovered that when a cortical hormone having the 3-keto-$\Delta^4$ structure in ring A and the 17α-hydroxy structure is treated with acetic anhydride in the presence of an acid catalyst preferably p-toluenesulphonic acid the compound is simultaneously subjected to enolization at C-3 and acetylation of the C-3 and C-17 hydroxy groups.

It has further been discovered that when cortisone acetate specifically is treated with acetic anhydride in the presence of p-toluenesulphonic acid, there is formed in only one step the triacetate of $\Delta^{3,5}$-pregnadiene-3,17α,21-triol-11,20-dione which is a cortical hormone exhibiting approximately 30% of the activity of cortisone acetate in the liver glycogen test.

In the broader aspects of the present invention there has therefore been provided certain novel 3,17α-acetoxy-derivatives of $\Delta^{3,5}$-pregnadiene-20-one which may be indicated by the following formula:

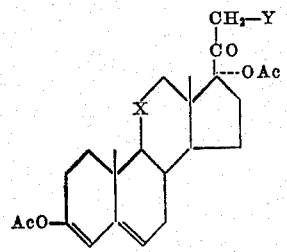

X may be CH₂, C=O, CH--OAc, or CH—OAc; Ac represents the acetyl radical (CH₃CO) and Y may be hydrogen or an acyloxy group such as the residue of acetic acid or the residue of another lower fatty acid.

Thus in practicing the process of the present invention as hereinafter outlined in detail the reaction of cortisone acetate with acetic anhydride in the present of p-toluenesulphonic acid gave the triacetate of $\Delta^{3,5}$-pregnadiene-3,17α,21-triol-11,20-dione a compound in which X of the above formula is C=O and Y is an acetoxy group. This compound had approximately 30% of the activity of cortisone acetate as measured by storage of glycogen in the liver. Therefore this compound may be utilized as a cortical hormone.

Similarly when 17α-hydroxyprogesterone is reacted with acetic anhydride in the presence of p-toluenesulphonic acid, there is produced the corresponding diacetate of $\Delta^{3,5}$-pregnadiene-3,17α-diol-20-one. When Kendall's Compound F, i.e. $\Delta^4$-pregnene-11β,17α,21-triol-3,20-dione is reacted there is produced the tetra-acetate of $\Delta^{3,5}$-pregnadiene-3,11β,17α,21-tetrol-20-one, and when the 11α epimer of Kendall's Compound F is reacted the corresponding tetra-acetate is produced.

The process of the present invention may be exemplified by the following equation illustrating the application thereof to the formation of the triacetate of $\Delta^{3,5}$-pregnadiene-3,17α,21-triol-11,20-dione.

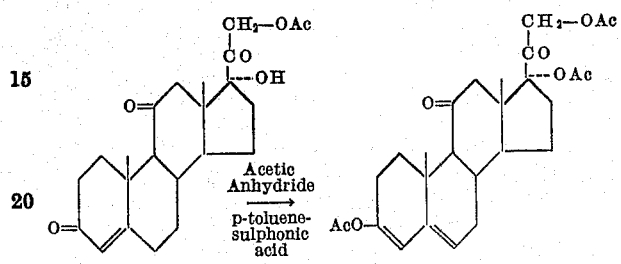

In practicing the process above outlined the starting material such as cortisone acetate for example is dissolved in acetic anhydride and an acid catalyst preferably p-toluenesulphonic acid added thereto. The mixture is then kept at room temperature or approximately 20° C. for a long period of time, i.e. about 70 hours with occasional agitation. The product is then precipitated as by pouring the reaction mixture into water and then separated and purified.

The following specific example serves to illustrate but is not intended to limit the present invention:

Example 1.14 g. of p-toluenesulphonic acid was added to a solution of 2 g. of cortisone acetate in 100 cc. of acetic anhydride and the mixture was kept for 70 hours at room temperature, with occasional shaking. The reaction mixture was then poured into water and the precipitate was filtered, washed to neutral, air dried and recrystallized from methanol. 2.3 g. was obtained of $\Delta^{3,5}$-pregnadiene-3,17α,21-triol-11,20-dione triacetate with a melting point of 151°–156° C. The substance shows an ultraviolet absorption maximum at 234 mμ (log E 4.38), characteristic of 3,5-dienes.

Analysis.—Calculated for $C_{27}H_{34}O_8$: C, 66.65; H, 7.04. Found: C, 66.77; H, 7.34.

We claim:

1. $\Delta^{3,5}$ - pregnadiene - 3,17α,21 - triol - 11,20 - dione triacetate.

2. A method for the preparation of 3,17α-acetoxy $\Delta^{3,5}$-pregnadiene-20-one derivatives of the following formula:

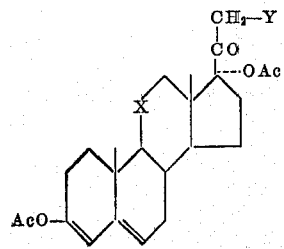

wherein X is selected from the group consisting of $CH_2$, C=O, CH—OAc and CH—OAc, Ac represents the acetyl radical and Y is selected from the group consisting of hydrogen and lower fatty acid acyloxy, which comprises reacting a corresponding $\Delta^4$-pregnene-17α-ol-3,20-dione compound with acetic anhydride in the presence of p-toluenesulfonic acid at room temperature for 70 hours.

3. The method of claim 2 wherein the product is $\Delta^{3,5}$-pregnadiene-3,17α,21-triol-11,20-dione triacetate and the starting compound is cortisone acetate.

4. The method of claim 2 wherein the acid catalyst is p-toluenesulphonic acid, the product is $\Delta^{3,5}$-pregnadiene-3,17α,21-triol-11,20-dione triacetate and the starting compound is cortisone acetate.

References Cited in the file of this patent

UNITED STATES PATENTS

| | | |
|---|---|---|
| 2,239,012 | Miescher | Apr. 22, 1941 |
| 2,668,817 | Magerlein | Feb. 9, 1954 |